United States Patent [19]

Holdren et al.

[11] 4,198,186
[45] Apr. 15, 1980

[54] SILO DIG OUT TOOL

[75] Inventors: John A. Holdren, Columbus; Raymond S. Holdren, West Liberty, both of Ohio

[73] Assignee: Holdren Brothers, Inc., West Liberty, Ohio

[21] Appl. No.: 973,119

[22] Filed: Dec. 26, 1978

Related U.S. Application Data

[63] Continuation of Ser. No. 809,782, Jun. 24, 1977, abandoned.

[51] Int. Cl.² ............................................. B65G 65/48
[52] U.S. Cl. .................................... 414/308; 299/76; 310/58; 414/306

[58] Field of Search ..................... 414/305, 306, 308; 299/73–78, 89; 37/7, 8, 188, 190; 310/58

[56] References Cited

U.S. PATENT DOCUMENTS

| 2,912,122 | 11/1959 | Horsley | 310/58 X |
| 3,044,753 | 7/1962 | Wilcox | 299/76 X |
| 3,543,948 | 12/1970 | Tatum | 414/326 |

Primary Examiner—Robert G. Sheridan
Attorney, Agent, or Firm—Biebel, French & Nauman

[57] ABSTRACT

A portable dig out tool for removing clogged silage from the lower part of a silo after the normal unloading equipment has failed. The tool is adapted to be manually inserted and withdrawn through an access opening in the lower portion of the outer wall of the silo.

7 Claims, 18 Drawing Figures

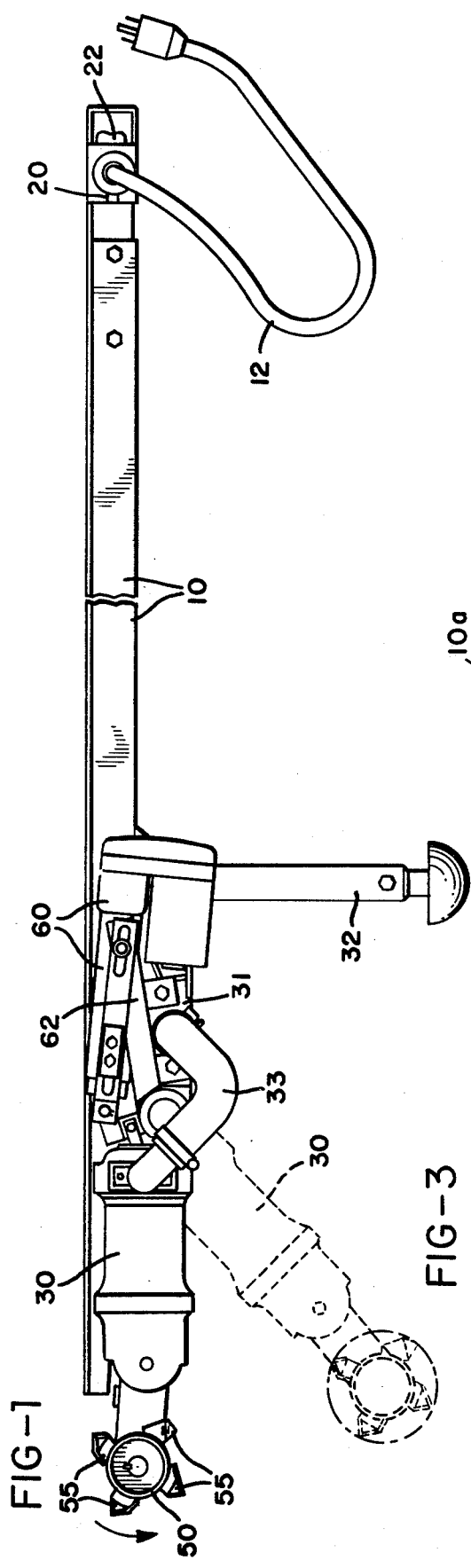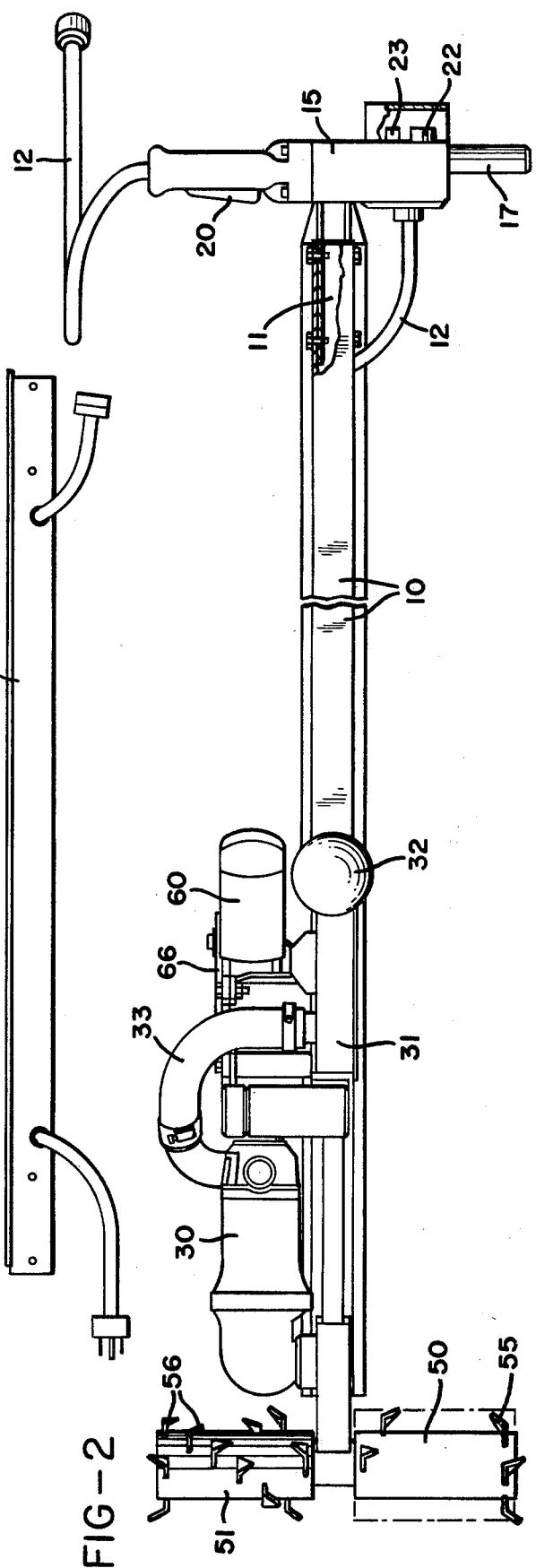

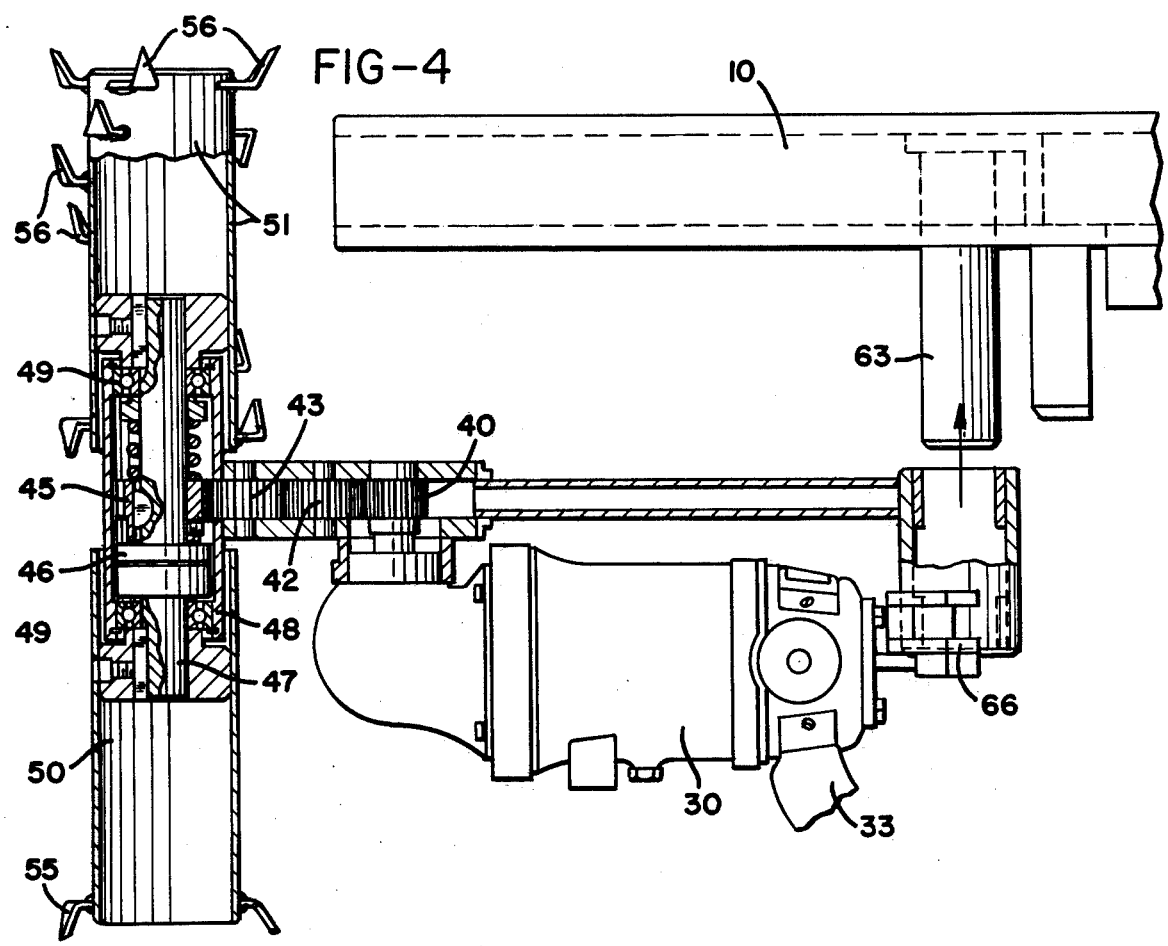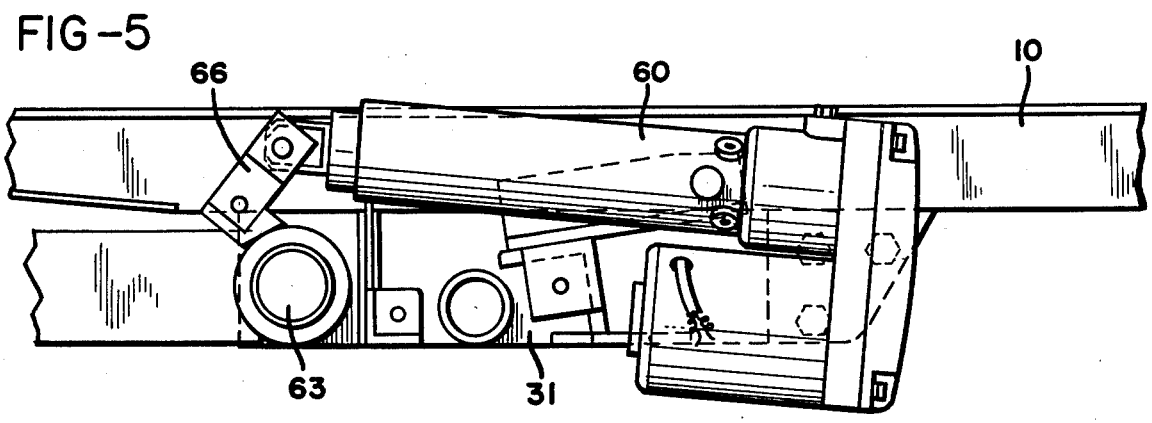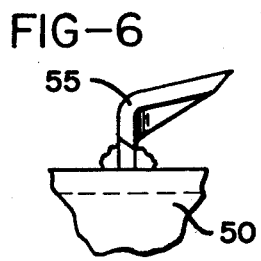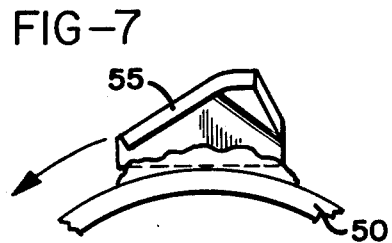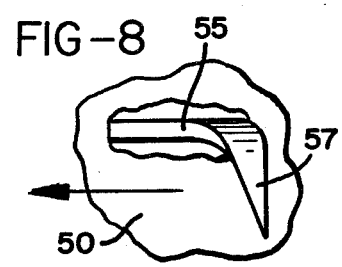

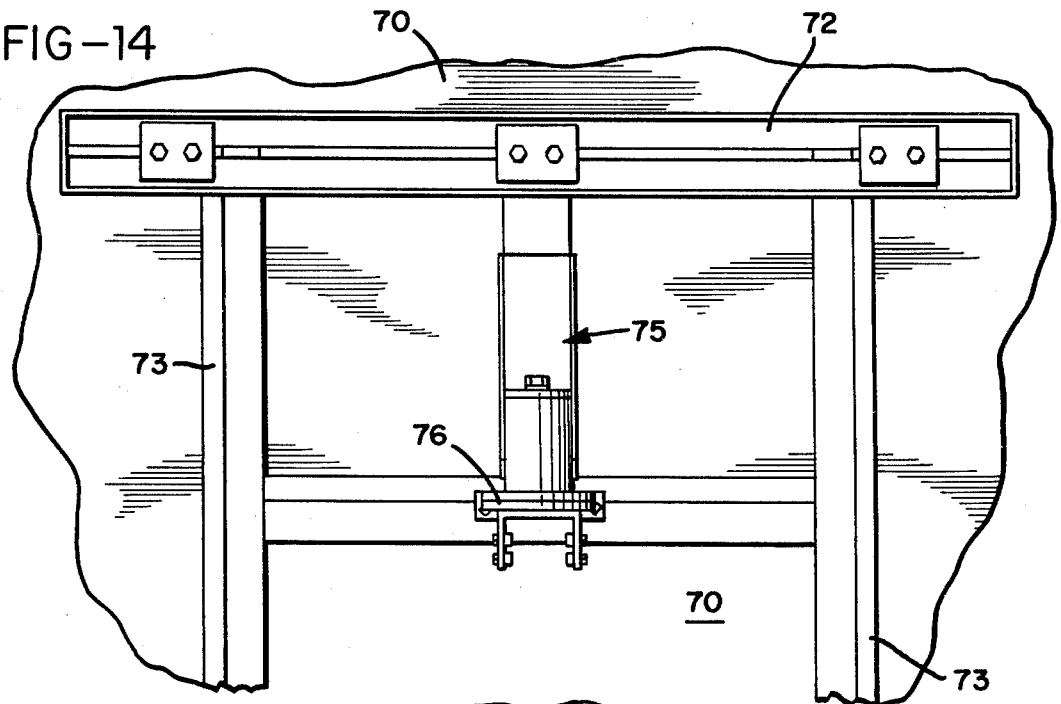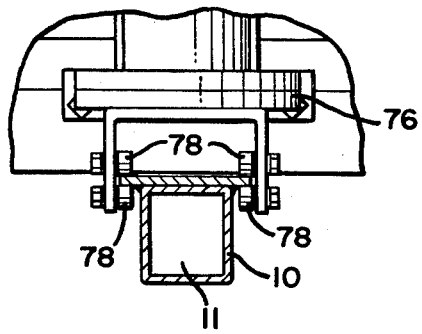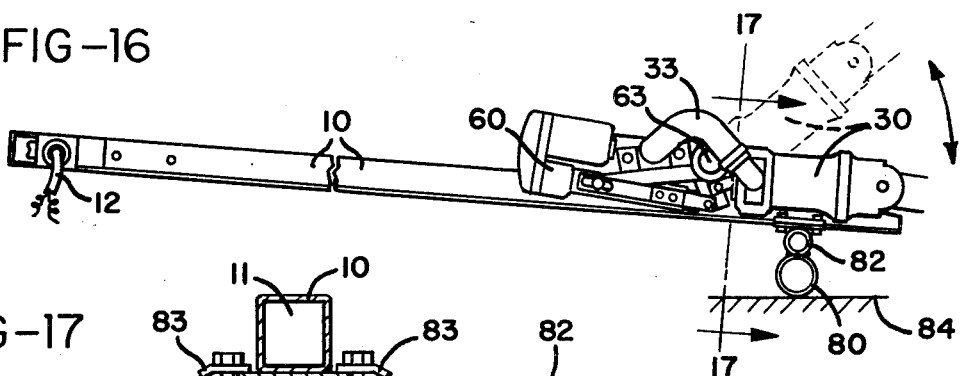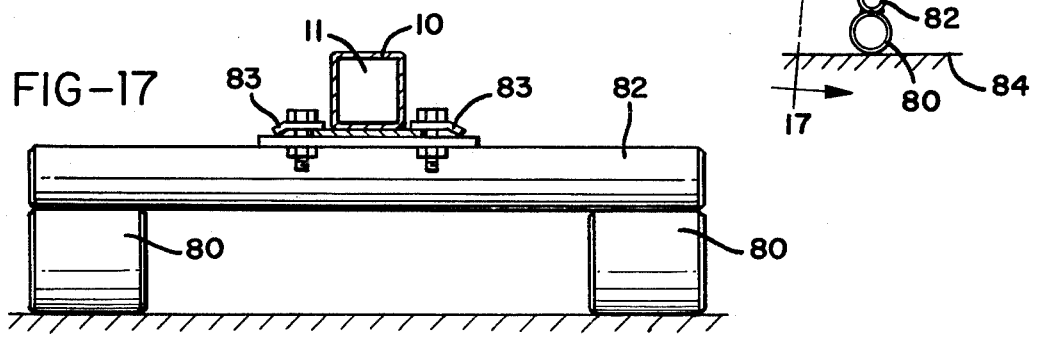

4,198,186

SILO DIG OUT TOOL

This is a continuation of application Ser. No. 809,782, filed June 24, 1977 now abandoned.

BACKGROUND OF THE INVENTION

A farm silo is an upright cylindrical container for receiving chopped hay, corn stalks, shelled grain, chopped corn and other farm products usually of a fibrous nature. It receives such material in the harvest period and stores the same usually with more or less fermentation and is unloaded for feeding cattle during the fall and winter period. A silo may have a diameter of approximately 16 to 25 feet and a height of the order of 20 to about 80 feet so that it contains a substantial volume and weight of silage material. The normal unloading equipment includes a rotating arm usually located centrally with a conveyor for delivering the material from the lower part of the silo to a discharge port. It sometimes occurs that the normal unloader equipment fails and it is then necessary to get into the lower part of the silo to remove clogged material so that the normal discharge function may be restored. The equipment heretofore proposed for this purpose has been cumbersome and awkward to use and has not satisfactorily fulfilled the need for a dig out device.

SUMMARY OF THE INVENTION

The present invention provides a silo dig out device which is compact, relatively easy to manipulate, and which affords access to the entire lower area of the silo so that the normal downward flow of the silage and its removal by the usual unloading equipment can be reestablished.

BRIEF DESCRIPTION OF THE DRAWINGS

FIG. 1 is a view in side elevation showing a dig out device in accordance with the present invention;

FIG. 2 is a bottom view of the same device;

FIG. 3 is a side elevational view of an extension housing to provide access to the inner bottom area of the silo;

FIG. 4 is a view partly in elevation and partly in section showing the mechanism for supporting and operating the dig out cutters;

FIG. 5 is a detail view in elevation showing the actuator mechanism for causing the vertical swinging of the cutter elements;

FIGS. 6, 7 and 8 are views showing the details of the construction and arrangement of the cutter teeth on the drum;

FIG. 14 is a sectional view on line 14—14 of FIG. 10 from outside the silo showing the device supported for use in the access opening;

FIG. 15 is a detail view showing the swivel support for the device;

FIGS. 16 and 17 are schematic views showing the device inverted and supported in operative position on the floor of the silo.

DESCRIPTION OF THE PREFERRED EMBODIMENTS OF THE INVENTION

Figure 9:
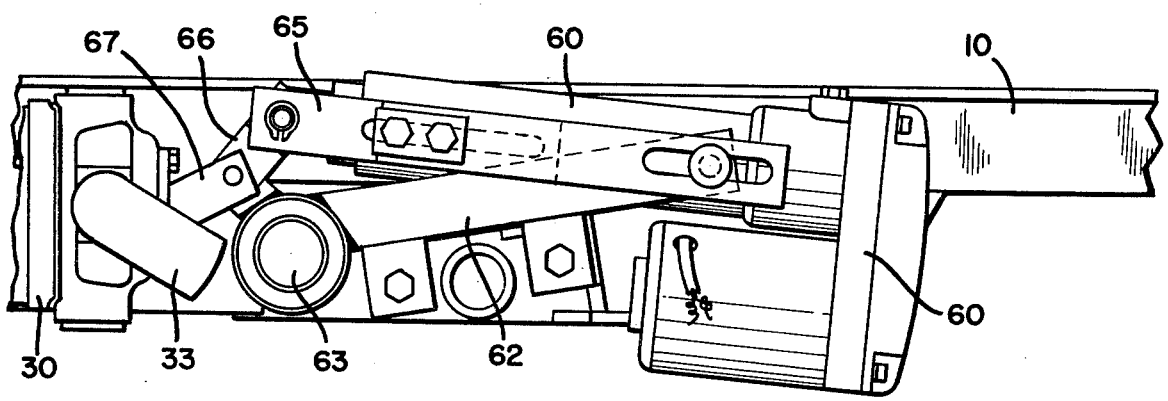
FIG. 9 is a detail view showing the mechanism by which the actuator causes the swinging of the cutter elements.

Referring now to the drawings, particularly FIGS. 1 and 2, the device includes a housing assembly 10 preferably rectangular in shape and having a hollow interior 11 which provides a passage for the wiring 12 and likewise a channel through which cooling air may flow from the perforate rear panel 15 which communicates with the hollow housing 11. A tube 17 is also connected to the rear panel 15 and is adapted to receive auxiliary air from an air compressor if that should be found desirable.

Control of the cutter is provided by a trigger 20 to turn the power means on and off, and by switch 22 for actuating the power means to cause the cutters to swing in a vertical arc. A reset button 23 is also available to allow for disconnecting the power means in the event of overload and for then reestablishing the power supply.

The motor which drives the cutter is shown at 30 and is connected to the power cable 12 through a connector box 31. An air conduit 33 communicates from box 31 which in turn opens into the hollow housing 11 to supply cooling air to motor 30. The weight of the housing, motor and cutters is supported on a leg 32 which rides on the floor of the silo.

Figure 18:
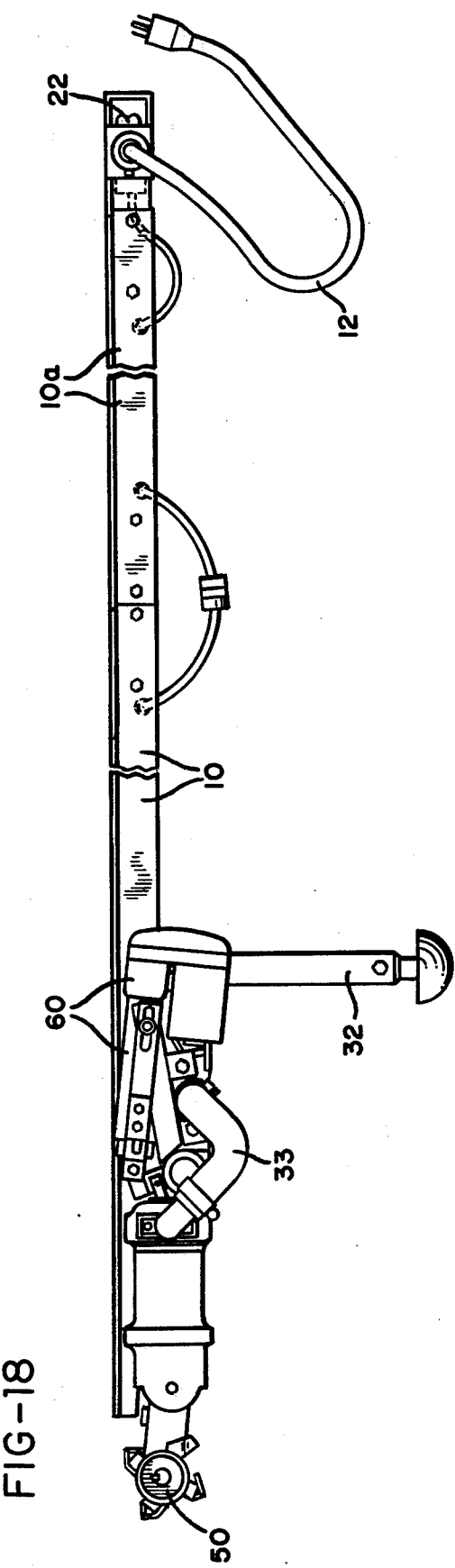
FIG. 18 is a view showing the extension housing in operating position.

FIG. 3 shows an extension housing on arm 10a which can be attached to housing 10 to allow the tool to be inserted to the innermost bottom area of the silo as shown in FIG. 18.

Referring now to FIGS. 4 and 5, motor 30 drives gear 40 which meshes with idler gears 42 and 43 to a drive gear 45 coupled through slip clutch 46 with shaft 47 journaled in tube 48 on bearings 49. Two cutter drums 50, 51 are mounted on hub 48 extending in opposite directions. The drum is provided with two series of spirally arranged cutter elements 55, 56 which are curved in opposite directions and each of which has a negative rake 57 as shown in FIG. 8 so that while they will progressively attack packed silage material, they will not hang up in the material and if they should encounter a solid obstruction, the result will be to cam the cutter head assembly away and thus prevent damage to the equipment. Also the reaction forces on the two sets of cutter teeth are substantially balanced. The material is then removed by means of a rake, fork, or other suitable tool.

A linear actuator 60 controlled from switch 22 is mounted for movement on brace 62 carried by pivot pin 63 and has an operating arm 65 pinned to a clevis 66 pivotally coupled to motor bracket 67.

Figure 10:
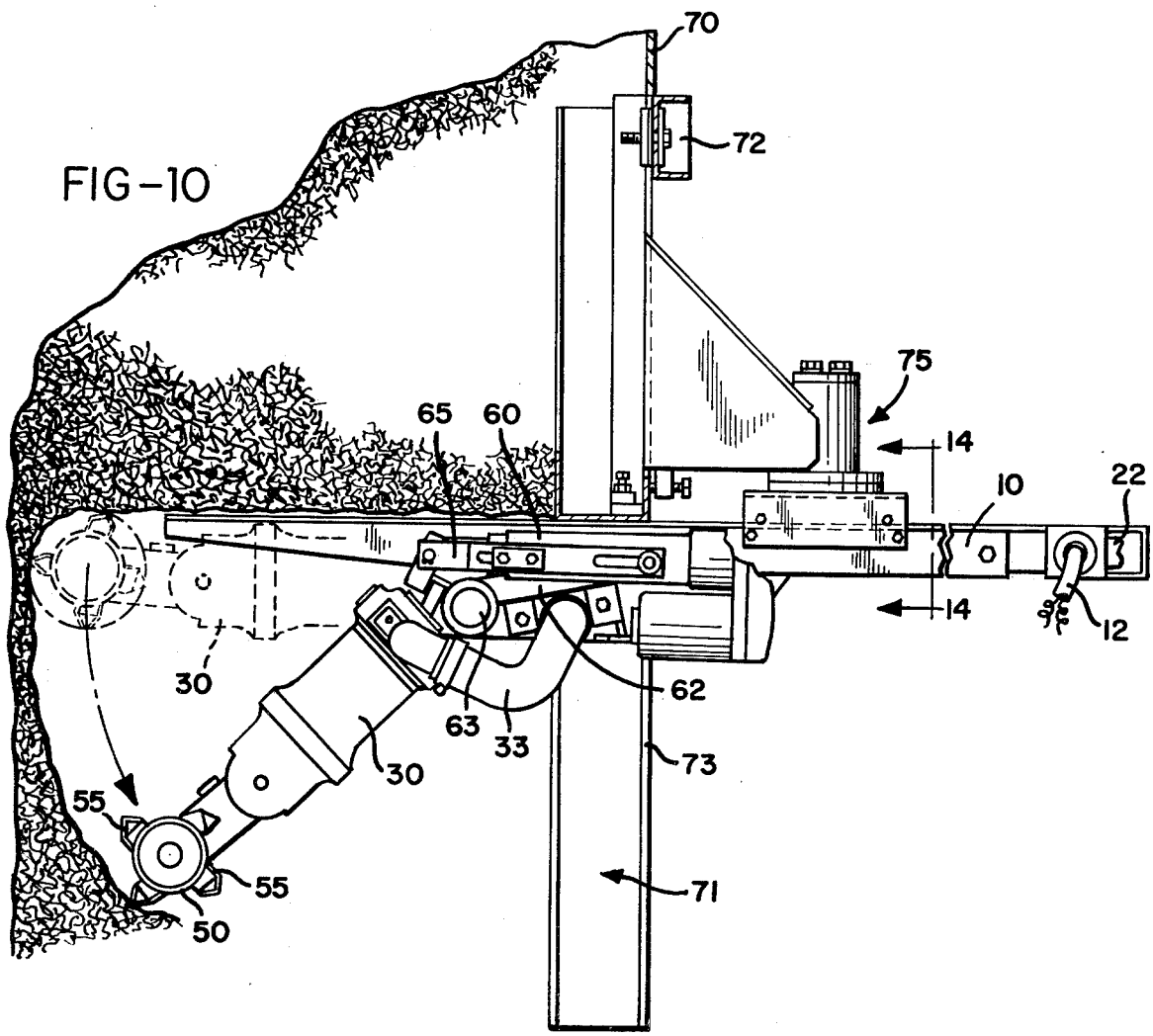
FIG. 10 is a view showing the cut out device in position on the access door of a silo.

From this it will be evident that in response to the energization of actuator 60, arm 65 will be caused to move in translation and thereby cause the entire motor and cutter assembly to swing in a vertical direction on the axis of pin 63. This motion is indicated in FIG. 10, it being understood that the cutting action against the packed silage occurs only when the cutters are moving in the downward direction.

Figure 11:
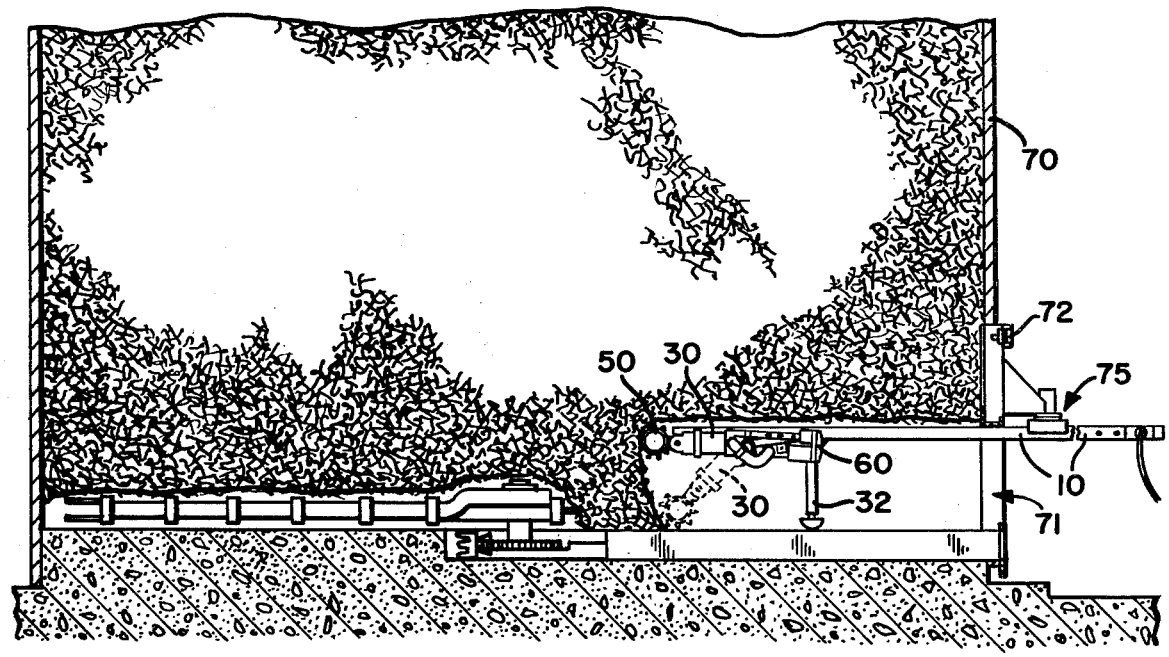
FIG. 11 is a view showing the device in use in the lower part of a silo.
Figure 12:
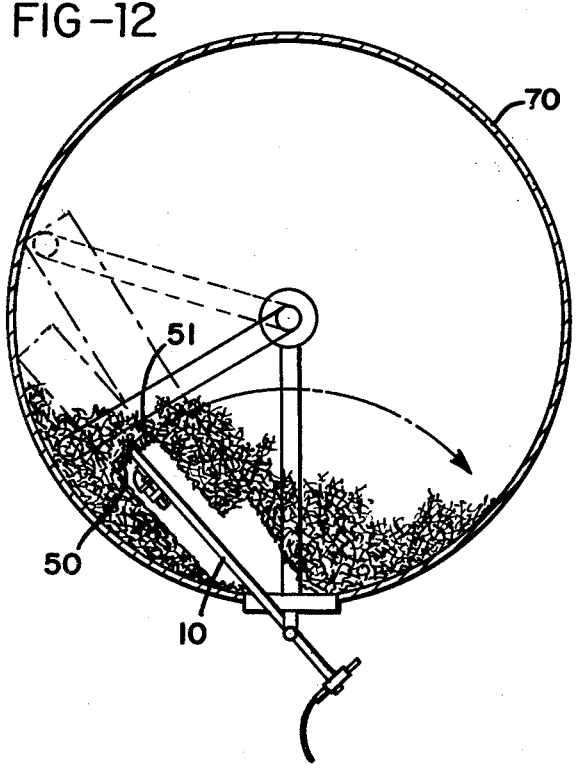
FIGS. 12 and 13 are schematic views showing how the dig out device is manipulated in a horizontal plane to dig out pockets of the silage.
Figure 13:
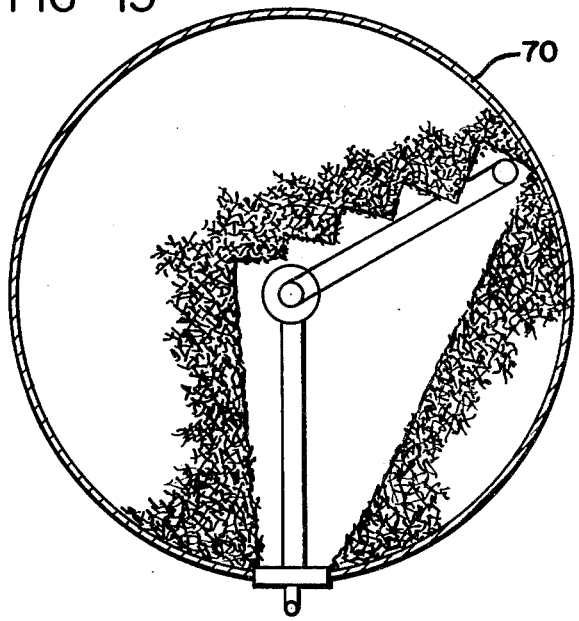

The silo wall indicated at 70 in FIG. 11 has an access port 71 framed by bars 72, 73 which provide for mounting a tool support assembly 75 thereon. The support includes a swivel 76 which allows the tool to be swung manually in a horizontal plane in order to provide proper access to different portions of the packed silage. Guide rollers 78 on the support frame also allow the tool to be advanced and retracted from the outside of the silo as the digging out operation progresses.

It is sometimes found desirable to use the tool in inverted position as shown in FIGS. 16 and 17 and for this purpose a pair of rockers 80 are carried by the support frame 75 to which they are fixed by means of a pipe 82 and clamps 83. When used in this mode the tool can be moved inwardly over the floor of the silo shown at 84 and the movement in the vertical plane now results in the motor and cutter head swinging upwardly rather than downwardly.

The invention thus provides a dig out tool for removing packed silage from the lower part of a silo which can be manually operated from outside the silo, manipulated in both horizontal and vertical directions, and advanced and retracted as needed to free the clogged material and to enable the normal discharge apparatus to resume function.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A portable silage dig out tool for removing packed silage material from the bottom of a silo having an access port in the lower portion of the outer wall thereof, comprising a housing including an elongated arm having an inner end adapted to be manually inserted and withdrawn through said port and having an outer end extending outside of the silo for manual manipulation, a supporting leg on the inner end of said housing mounted in depending relation from said housing and slidable on the floor of the silo, articulated power means on the inner end of said housing inwardly of said leg, cutter means carried by the innermost end of said power means coupled with and operable by said power means to cut into and remove said material, said cutter means including a pair of axially aligned drums each having a series of cutter teeth mounted on the surface thereof, and means for swinging said power means and cutter means together to progressively attack and remove said packed material.

2. A tool as defined in claim 1 in which the cutter teeth are formed with ends which are inclined in opposite axial directions, such that the reaction forces thereof on the drums are balanced.

3. A tool as defined in claim 1 including an extension arm connectible to said housing for enabling said cutter means to reach the remote inner wall of said silo.

4. A tool as defined in claim 1 in which said housing is hollow and forms a conduit for supplying cooling air to said power means.

5. A tool as defined in claim 1 in which said means for swinging said power means and cutter means comprises a linear actuator mounted on said housing and engaging said power means.

6. A tool as defined in claim 1 in which said cutter teeth define cutting edges having a negative rake such that said teeth cut through said packed silage material without hanging up in said material and will cam away from any solid obstructions which are encountered in said silo.

7. A tool as defined in claim 1, further comprising mounting means mountable adjacent said access port, for engaging said housing and providing support for said tool, whereby said tool may be manually manipulated.

* * * * *

UNITED STATES PATENT AND TRADEMARK OFFICE
Certificate

Patent No. 4,198,186                                        Patented April 15, 1980

JOHN A. HOLDREN & RAYMOND S. HOLDREN

Application having been made by John A. Holdren and Raymond S. Holdren, the inventors named in the patent above identified, for the issuance of a certificate under the provisions of Title 35, Section 256, of the United States Code, deleting the name of John A. Holdren and adding the name of Richard D. Holdren as joint inventors, and a showing and proof of facts satisfying the requirements of the said section having been submitted, it is this 16th day of November 1982, certified that the name of the said John A. Holdren is hereby deleted from the said patent and Richard D. Holdren is hereby added to the said patent as a joint inventor with the said Raymond S. Holdren.

Fred W. Sherling,
*Associate Solicitor*